United States Patent
Boydens et al.

(10) Patent No.: US 10,117,374 B2
(45) Date of Patent: Nov. 6, 2018

(54) FORAGE HARVESTER SWATH SENSOR

(71) Applicant: CNH Industrial America LLC, New Holland, PA (US)

(72) Inventors: Joachim Boydens, Zedelgem (BE); Pieter Vanysacker, Moere (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 246 days.

(21) Appl. No.: 15/029,518

(22) PCT Filed: Oct. 28, 2014

(86) PCT No.: PCT/EP2014/073126
§ 371 (c)(1),
(2) Date: Apr. 14, 2016

(87) PCT Pub. No.: WO2015/063089
PCT Pub. Date: May 7, 2015

(65) Prior Publication Data
US 2016/0270286 A1    Sep. 22, 2016

(30) Foreign Application Priority Data

Oct. 28, 2013 (BE) .............. BE2013/0724

(51) Int. Cl.
*A01B 69/04* (2006.01)
*A01B 69/00* (2006.01)
(Continued)

(52) U.S. Cl.
CPC .......... *A01B 69/008* (2013.01); *A01B 69/003* (2013.01); *A01B 69/007* (2013.01); *A01D 41/1278* (2013.01); *A01D 89/001* (2013.01)

(58) Field of Classification Search
CPC .. A01D 89/001; A01D 41/1278; A01B 69/00; A01B 69/001; A01B 69/007; A01B 69/008; A01B 69/003
(Continued)

(56) References Cited

U.S. PATENT DOCUMENTS 3,991,618 A    11/1976   Stampfer et al.
5,410,479 A *   4/1995   Coker .................. G05D 1/0255
                                                180/168
(Continued)

FOREIGN PATENT DOCUMENTS

EP       887660 A2    12/1998
EP      1630574 A2     3/2006
EP      2272312 B1     6/2012

OTHER PUBLICATIONS

PCT/EP2014/073126, Written Opinion of the International Searching Authority, dated May 7, 2015.
(Continued)

*Primary Examiner* — John Weiss
(74) *Attorney, Agent, or Firm* — Peter K. Zacharias; Patrick M. Sheldrake

(57) ABSTRACT

A forage harvester including a header for picking up a swath from a ground surface. The header includes a first and a second distance sensor adapted to measure a sensor-to-target distance respectively along a first and second sensor axis. The first distance sensor is mounted at a first lateral end of the header, and the second distance sensor is mounted at a second lateral end of the header. The first and second distance sensors are positioned such that, when the forage harvester is placed on an even ground surface, the first sensor axis crosses the second sensor axis before reaching the even ground surface in front of the harvester.

13 Claims, 2 Drawing Sheets

(51) Int. Cl.
*A01D 41/127* (2006.01)
*A01D 89/00* (2006.01)

(58) Field of Classification Search
USPC .............................. 56/10.2 R, 10.2 F; 701/50
See application file for complete search history.

(56) References Cited

U.S. PATENT DOCUMENTS

| | | |
|---|---|---|
| 5,509,486 A | 4/1996 | Andersen |
| 5,606,504 A | 2/1997 | Andersen |
| 5,715,665 A | 2/1998 | Diekhans et al. |
| 5,745,225 A | 4/1998 | Watanabe et al. |
| 6,101,795 A | 8/2000 | Diekhans |
| 6,389,785 B1 * | 5/2002 | Diekhans ............. A01B 69/001 172/4.5 |
| 6,668,223 B2 * | 12/2003 | Blackmore .......... A01D 41/127 701/408 |
| 6,791,488 B2 | 9/2004 | Diekhans et al. |
| 6,839,127 B1 | 1/2005 | Anderson |
| 7,350,343 B2 | 4/2008 | Beck |
| 2015/0319911 A1 * | 11/2015 | Wilson ..................... G06T 7/20 701/41 |

OTHER PUBLICATIONS

PCT/EP2014/073126, International Search Report, dated May 7, 2015.

* cited by examiner

FORAGE HARVESTER SWATH SENSOR

CROSS REFERENCE TO RELATED APPLICATION

This application is the National Stage of International Application No. PCT/EP2014/073126 filed on Oct. 28, 2014, which claims priority to Belgian Application BE2013/0724 filed Oct. 28, 2013, each of which applications is incorporated herein by reference in its entirety.

FIELD OF THE INVENTION

The present invention relates to a forage harvester. In particular, the invention relates to a forage harvester with a swath sensor.

BACKGROUND OF THE INVENTION

Forage harvesters, in particular self-propelled forage harvesters, comprise a header that is provided to pick up a swath from a ground surface. The swath typically comprises crop material, which crop material is then processed by the forage harvester when picked up by the header.

In a conventional forage harvester, an operator steers the forage harvester over the swath. There, the operator aims to direct the forage harvester centrally over the swath, such that the center of gravity of the swath is aligned with the transverse center of the forage harvester. This allows a balanced processing of the swath by the forage harvester.

Attempts have been made to assist the operator in steering the forage harvester, or to (partially) automate the movement of the forage harvester. There, a camera is placed near the cabin of the forage harvester, and the images coming from the camera are processed to detect the position of the swath. This detected position of the swath can then be used and to steer the forage harvester (partially) automatically over the swath, or to assist the operator. A drawback of the known system is that processing of images from a camera is complex and time-consuming. Furthermore, changing outdoor light conditions and the fact that the swath colour is typically close to the surrounding ground colours, have as a result that swath detection by means of a camera is not possible in all circumstances. Therefore, the current system is unreliable for, and unable to assist the operator and/or to (partially) automate the forage harvester.

SUMMARY OF THE INVENTION

It is an object of the present invention to provide a forage harvester wherein a more reliable swath detection system is provided.

To this end, the invention provides a forage harvester comprising a header that is provided to pick up a swath from a ground surface, characterised in that the header comprises a first and a second distance sensor being adapted to measure a sensor-to-target distance respectively along a first and second sensor axis, wherein the first distance sensor is mounted at a first lateral end of the header, and wherein the second distance sensor is mounted at a second lateral end of the header, and wherein the first and second distance sensors are positioned such that, when the forage harvester is placed on an even ground surface, the first sensor axis crosses the second sensor axis before reaching the even ground surface in front of the harvester.

The forage harvester is provided with a header that can pick up a swath from a ground surface. The header is therefore mounted in a proximity of the ground surface (at least in an operating state of the harvester). The header is provided with two distant sensors, each distance sensor placed at a location of a lateral end of the header. Since the distance sensors are mounted on the header, these sensors are mounted relatively close to the ground surface, as the operative header is mounted in a proximity of the ground surface. The distance sensors are operable to measure a sensor-to-target distance in one direction (along a sensor axis). Here, the sensors are positioned such that their sensing axes cross before reaching the ground surface in front of the forage harvester. The sensor axes, which start at the sensors that are located at lateral ends of the header, extend over a ground surface in front of the harvester in a diagonal manner. Because the sensor axes extend, close to the ground surface, over the ground surface in front of the forage harvester, and because the sensor axes cross each other, the distance sensors will always detect a raised object arising in front of the forage harvester, since this raised object will interrupt at least one of the first and second sensor axes. In this manner, the forage harvester of the invention can detect a swath, when the sensor-to-target distance of at least one sensor is (substantially) less than the sensor to ground surface distance. Such substantially less distance indicates that an object interrupts the sensor axis. Based on the measured distance, the position of the swath can be detected. The distance sensor being adapted to measure a sensor-to-target distance in one direction can be compared with a distance camera having only one pixel. It will be clear that processing only two pixels (first and second distance sensor) is substantially less complex and time consuming than processing a complete camera image (typically containing hundreds of pixels). Therefore, the present invention is much cheaper as a sensor to detect a swath, requiring no extra processing hardware on the machine (providing there are two analogue inputs present on the current controller) than prior art systems. Furthermore the measured distance is independent from outdoor light conditions and independent from swath colours. Therefore these conditions and colours cannot negatively affect the swath detection.

Preferably the forage harvester is a self-propelled forage harvester. Unlike towed forage harvesters, self-propelled forage harvesters have their header positioned at the very front end of the harvester. This gives the distance sensors a free area in front of the header into which the sensor axes can extend. Therefore in the positioning of the distance sensors, obstructions by a towing tractor should not be considered.

Preferably, the first and second distance sensors are time-of-flight sensors. Time-of-flight is a known technical principle to measure a distance in a highly reliable manner. Different types of time-of-flight sensors are known, for example laser sensors. Time-of-flight cameras have proven to be reliable in a dusty outdoor environment in which the forage harvester typically operates.

Preferably, the first and second distance sensors are symmetrically positioned with respect to an upright plane that comprises a central axis parallel to a travelling direction of the forage harvester. By mounting the distance sensors in a symmetrical manner, when an object rises in a central zone in front of the forage harvester (for example a swath), the raised object will affect the sensor-to-target distance of the first and second sensor in the same manner. When the raised object deviates (is positioned offset) from the central zone (to the left or to the right), the measured sensor-to-target distances deviate from one another proportionally to the offset of the raised object. This allows to detect the swath position via the first and second distance sensors, and to steer the harvester in a logical and straightforward manner.

Preferably, the first and second distance sensors are mounted higher than 20 cm above even ground surface, preferably higher than 30 cm above even ground surface. By mounting the distance sensors higher than 20 cm, preferably higher than 30 cm above even ground surface, the influence of vibrations of the header on the sensor-to-target distance decreases significantly. Tests have shown that the influence of these vibrations can be filtered quite easily (via filtering techniques that are known to the skilled person) when the distance sensors are mounted higher than 20 cm, preferably higher than 30 cm above ground surface.

Preferably, the first and second distance sensors are mounted lower than 60 cm above said even ground surface, preferably lower than 50 cm above even ground surface. By mounting the distance sensor lower than 60 cm, preferably lower than 50 cm above ground surface, swaths with limited heights are detectable by the distance sensors. When the distance sensors are mounted too high, the sensor axes could run over a swath with small height so that the swath is not detected. By mounting the sensor lower than 60 cm, preferably lower than 50 cm, a swath can be detected in the majority of situations. It will be clear to the skilled person that the preferred mounting height of the distance sensors is the height of the sensors in the operating state of the forage harvester. Should the forage harvester have a header the height of which is adaptable, then the distance sensor height shall be the height in at least one of the operating states of the forage harvester. Here, the height of the sensor relative to the header can be fixed, or can be adjustable (for example to be adjusted together with the height of the header).

Preferably, the first and second distance sensors are positioned such that, when the forage harvester is placed on an even ground surface, the first sensor axis reaches the even ground surface in front of the harvester at a distance from the sensor that is larger than 3 m, preferably larger than 4 m, more preferably larger than 5 m, and at a distance from the sensor that is smaller than 8 m, preferably smaller than 7 m. Tests have shown that optimal results can be obtained with such configuration.

Preferably, the forage harvester further comprises a controller operationally connected to the first and the second distance sensor and provided for receiving a respective input from the first and second distance sensor, the controller being further operationally connected to a steering means of the forage harvester, wherein the controller is adapted to steer the forage harvester based on said input. Via the controller, the operator can be assisted in steering the forage harvester, or the movement of the forage harvester can be (partially or completely) automated. There, the controller uses input from the first and second distance sensors, and is connected to the steering means of the forage harvester.

Preferably, the controller comprises a comparator for comparing said input of the first distance sensor with an input of the second distance sensor to obtain a deviation value, wherein the controller is adapted to steer the forage harvester based on said deviation value. Particularly when the distance sensors are symmetrically positioned, the deviation value (obtained via comparing the first and second input) is directly proportional to the offset of the swath with respect to the center of the harvester. Comparing two distance values via a comparator is technically simple and easy to obtain (particularly when compared to image analysis to detect a swath in an image). Furthermore the deviation value proves to be a reliable basis for determining the position of the swath.

Preferably, the first and second distance sensors are positioned such that said sensor axes show an angle with respect to the forward travelling direction of the forage harvester that is larger than 35 degrees, preferably larger than 40 degrees, and that is smaller than 55 degrees, preferably smaller than 50 degrees. Tests have shown that optimal results can be obtained with such configuration.

Preferably, said first sensor axis crosses said second sensor axis at a crossing point that is located at a distance from the first sensor that is substantially equal to the distance between the second sensor and the crossing point. As a result, when a swath arises at the crossing point, the sensor-to-target distance measured by the first sensor will be substantially equal to the sensor-to-target distance measured by the second sensor. This facilitates the interpretation of the measured values, and thereby facilitates the use of the sensors for detecting the swath position (and facilitates the steering the forage harvester). It is to be noted that the first and second sensor axis do not necessarily intersect at a crossing point. Both sensor axes may also cross each other at a certain distance.

The invention further relates to a steering system for a forage harvester, the steering system comprising a controller operationally connected to a first and a second distance sensor being adapted to measure a sensor-to-target distance respectively along a first and second sensor axis, wherein the distance sensors are provided to be placed at the location of a first and second lateral end of a header of the forage harvester such that when the forage harvester is placed on an even ground surface, the first sensor axis crosses the second sensor axis before reaching the even ground surface in front of the harvester, wherein the controller is provided to control a steering means of the harvester based on an input of the first and second distance sensor.

The effects of the technical features of the steering system for a forage harvester are explained above in relation to the forage harvester. Therefore reference is made to the description above.

The invention further relates to a method for steering a forage harvester using a steering system of the invention, the method comprising the steps:
  providing a first sensor-to-target distance, determined via the first distance sensor, to a controller;
  providing a second sensor-to-target distance, determined via the second distance sensor, to the controller;
  calculating a difference between the first sensor-to-target distance and the second sensor-to-target distance;
  steering the forage harvester based on the calculated difference.

Providing a distance value (first sensor-to-target distance and second sensor-to-target distance) to a controller is technically simple to realize. Furthermore calculating a difference value based on two inputs (distance values) is also technically simple to realize. No complex algorithms or analyses are to be made to obtain the difference. Based on this difference value, which is simple to obtain, the forage harvester can be steered.

BRIEF DESCRIPTION OF THE DRAWINGS

The invention will now be described in more details with respect to the drawings illustrating some preferred embodiments of the invention. In the drawings.

DETAILED DESCRIPTION OF THE INVENTION

Figure 1:
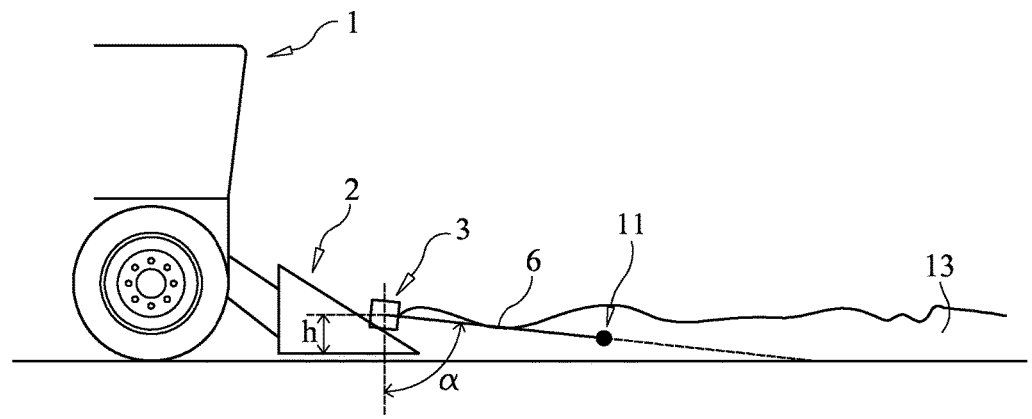
FIG. 1 illustrates a side view of the harvester of an embodiment of the invention.

In the drawings a same reference number has been allocated to a same or analogous element.

FIG. 1 shows a self-propelled forage harvester 1. The forage harvester 1 comprises a header 2, located at a front end of the forage harvester 1 and close to a ground surface. The header 2 is provided to pick up a swath 13 of crop material, to process the crop material in the forage harvester 1. Here it is noted that FIG. 1 shows an operating state of the forage harvester 1, wherein the header 2 is close to a ground surface. The forage harvester 1 might also have a transport state, wherein the header 2 is lifted from the ground surface. Since the invention functions in the operating state of the forage harvester 1, only this state is considered in the further description (particularly when defining the height h of the sensors 3 and 4).

Figure 2:
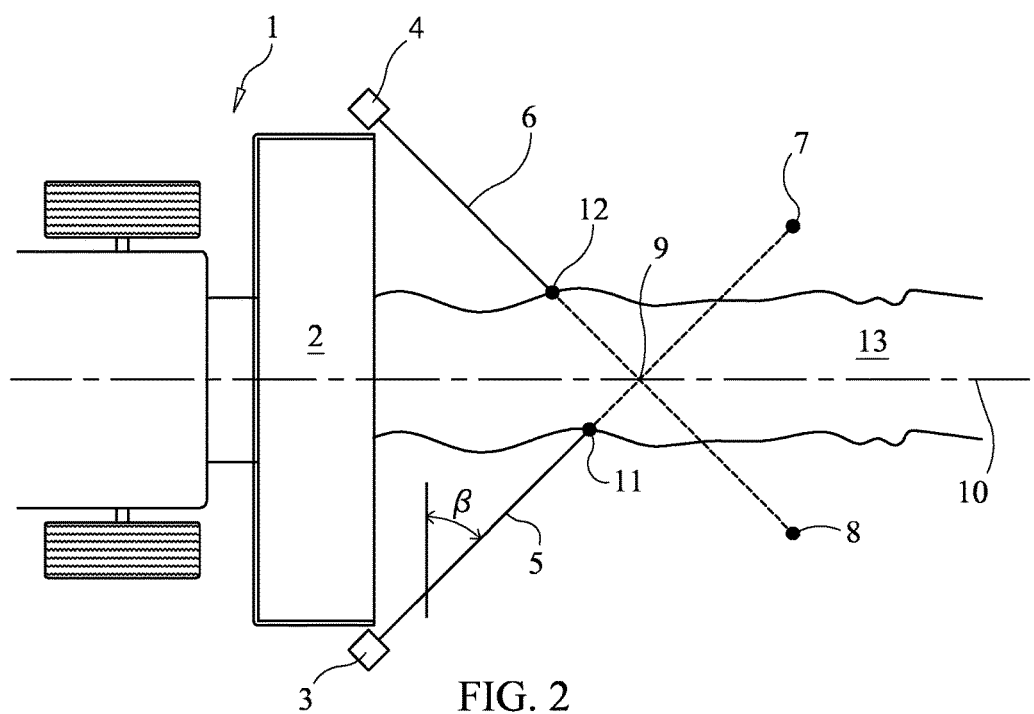
FIG. 2 illustrates a top view of the harvester of FIG. 1.

FIG. 2 shows two sensors 3, 4 that are mounted at opposite lateral ends of the header 2. Here, the figure shows the sensors 3, 4 being mounted at the physical lateral end of the header 2, whereby the sensors 3, 4 extend in the lateral direction from the header 2. However, it will be clear to a skilled person that the sensors 3, 4 should be placed (somewhere) at a location of the lateral ends of the header 2. In this context the wording 'at the location of' is preferably defined as 'within an area having a radius of maximum 100 cm around' a point at the lateral end of the header 2. However, preferably, the area has a radius of maximum 50 cm, more preferably maximum 30 cm. This means that the sensor should be placed somewhere in an area of maximum 30 cm (in the more preferred situation) around a point at the lateral end of the header 2. For shorter headers it will be more important that the sensors are placed close to the outer ends of the header than for wider headers.

Each sensor 3, 4 is a distance sensor. A distance sensor is operable to measure a sensor-to-target distance. Herein, the target is a physical object crossing the sensing axis of the distance sensor. For each of the distance sensors 3, 4, a sensing axis (respectively indicated by reference numbers 5, 6) can be defined. The sensors 3, 4 each measure a sensor-to-target distance along a respective sensing axis 5, 6, wherein the target is the physical object that crosses the sensing axis closest to the sensor.

FIG. 1 shows how the sensors are placed at a height h with respect to the ground surface. Preferably this height is higher than 20 cm, more preferably higher than 30 cm, and this height is preferably lower than 60 cm, preferably lower than 50 cm above even ground surface. Furthermore, the sensors 3, 4 are placed such that their sensing axes 5, 6 show an angle with respect to the upward direction (this angle is shown in FIG. 1 with reference a), that is smaller than 90°. Furthermore, this angle α is preferably greater than 80°. Tests have shown that an optimal sensing result is obtained when the sensors 3, 4 are placed with their sensing axes 5, 6, showing an angle between 84° and 88° with respect to the upward direction. As a result of this angle α, when the forage harvester 1 is placed on an even ground surface, the sensing axes 5, 6 of the sensors 3, 4 will touch the ground surface at respective spots 7, 8, which spots 7, 8 are located minimum 3 m, preferably minimum 4 m, and maximum 8 m, preferably maximum 7 m, away from the header 2 of the forage harvester 1. A further result of the angle α, and the limited height h at which the sensors 3, 4 are mounted, is that the sensing axes 5, 6 hover over the ground surface in front of the forage harvester. Since these axes hover (implying that the distance between sensing axes and the ground surface is limited) over the ground surface, an object raising up in front of the forage harvester (for example a swath) will cross at least one of the sensing axes 5, 6. Such crossing can be detected by the sensors 3, 4 since sensor-to-target distance will be significantly shorter than the sensor-to-spot 7, 8 distance.

FIG. 2 shows how the sensors 3, 4 are positioned such that their sensing axes 5, 6 cross each other at crossing point 9 before touching even ground surface at spots 7, 8. Because the sensing axes 5, 6 cross each other, the combined sensing axes 5, 6 hover over the ground surface over the substantially complete width of the forage harvester 1. As a result, an object arising anywhere over the width in front of the forage harvester can be detected by the sensors 3, 4. The sensors 3, 4 are preferably positioned such that the sensing axes 5, 6 show an angle β of about 45° with respect to the transverse direction. Here about is defined as +/−10°, preferably as +/−5°.

Preferably, the sensors 3, 4 are placed and oriented symmetrically with respect to an imaginary upright plane comprising the center line 10 of the forage harvester (the center line being the central line in the forward direction of the harvester 1). As a result, the sensing axes 5, 6 will cross symmetrically, meaning that the crossing point 9 lays on the upright plane comprising the center line 10 of the harvester 1. This has as a result that when an object arises on the ground surface on the central line 10, the sensor-to-target distances for the sensors 3, 4 will be equally impacted by the object. Furthermore, when an object arises that is offset with respect to the center line of the harvester 1 (meaning the object arises out of the center), then the difference between the sensor-to-target distance of the first sensor 3, and sensor-to-target distance of the second sensor 4 will differ, the difference being indicative of the offset of the object.

FIGS. 1 and 2 show a swath 13 in front the forage harvester 1. The sensor axes 5, 6 are partially shown in full lines, and partially in dotted lines. Here, the full lines illustrate the sensor-to-target distance when the swath 13 is present, while the combination of full lines and dotted lines illustrate the sensor-to-target distance when the harvester is placed on an empty even ground surface. The figure shows how the sensor 3 (placed at the right hand side of the header 2) measures the distance between the sensor 3 and the right hand side of the swath 13, shown with reference number 11. The sensor 4 (placed at the left hand side of the header) measures the distance between the sensor 4 and the left hand side of the swath 13 illustrated with reference number 12. When these distances are equal, the harvester faces the center of the swath. In the shown example, the swath is somewhat offset to the left, such that the sensor-to-target distance at the left sensor 4 is significantly smaller than the sensor-to-target distance at the right sensor 3. From this example it is clear how the two distance sensors 3, 4 can, due to their specific positioning and orientation on the header 2, detect the location of a swath 13 in front of the forage harvester.

Figure 3:
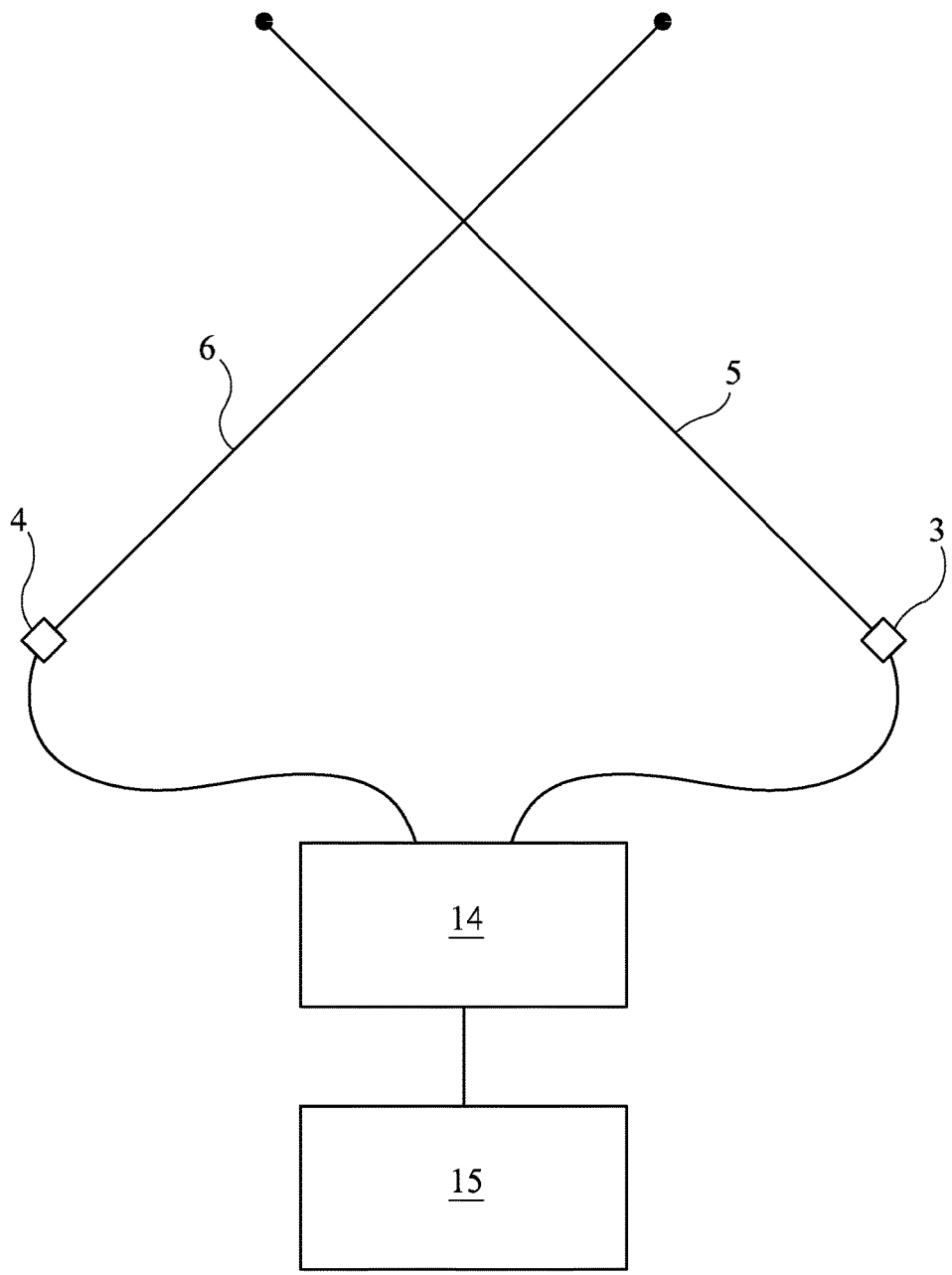
FIG. 3 illustrates an operational connection between the sensors and a further control system according to an embodiment of the invention.

FIG. 3 shows how the sensors 3, 4, respectively sensing a sensor-to-target distance along sensing axes 5, 6, are operationally connected to a controller 14. In its simplest form, this controller 14 comprises a comparator for comparing the sensor-to-target distance of sensor 3 to the sensor-to-target distance of sensor 4. From the comparison a difference value can be determined. This difference value, as is made clear in the example of FIG. 2, is proportional to an offset of the swath 13 rising in front of the harvester 1. The skilled person will recognize that other logic can be added in the controller to extract information from these two measured distances. For example the width of the swath can be monitored, and the speed of the harvester then is made proportional to the measured width. In a more sophisticated example, when the positions and mounting angles of the sensors in space are known, and the measured distances are known, the coordinates in space of measurement points 11 and 12 can be calculated. This gives two points in space that are known to lie on the surface of the swath. Swath properties can then be estimated such as the width but also height and detection distance in front of the header. This distance information can be used for more accurate steering and path planning of the vehicle.

In an alternative embodiment, the skilled person can provide only one distance sensor to the header, at the location of one of the lateral ends. When a swath is present in front of the harvester, one point in space can be calculated that is known to lie on the surface of the swath. When the swath is assumed to have a predetermined width and a predetermined height, the complete position of the swath can be determined using this one single distance sensor.

The controller 14 is preferably further connected to a steering means 15. The steering means 15 is adapted for (partially) automatically steering the forage harvester. Here, the forage harvester is preferably steered such that the center of the header 2 is aligned with the center of the swath 13. Alternatively, the controller 14 is operationally connected to an interface which provides information to an operator of the forage harvester regarding the position of the swath 13.

The distance sensors 3, 4 are preferably time-of-flight sensors. However, the skilled person will recognize that other types of distance sensors can also be used in the invention. More preferably, the sensors 3, 4 are laser sensors or ultrasonic sensors.

Preferably, the sensors 3, 4 are mounted on an upwardly extending rail that allows amending the height of the sensors 3, 4 with respect to the ground surface. Such rails would therefore allow an operator to choose an optimal height of the sensor depending on the current working situation. For example, when a swath 13 has a significant height (for example 50 cm), the sensors 3, 4 can be placed at a height of about 60 cm. In another situation where the height of the swath 13 is rather limited, for example 20 cm, the sensors 3, 4 are preferably positioned at a height of about 25 cm.

The above described embodiments and the shown Figures are illustrative and serve only for a better understanding of the invention. The invention is not limited to the described embodiments. Different alternatives, and preferred features described in the text can be freely combined by a skilled person and developed in more detail to form an operational whole without departing from the claimed invention. The scope of protection of the invention will therefore be defined solely by the claims.

The invention claimed is:

1. A forage harvester comprising:
   a header to pick up a swath from a ground surface, the header comprising a first and a second distance sensor being adapted to measure a sensor-to-target distance respectively along a first and second sensor axis, wherein the first distance sensor is mounted at a first lateral end of the header and wherein the second distance sensor is mounted at a second lateral end of the header, and wherein the first and second distance sensors are positioned such that, when the header is placed on an even ground surface, the first sensor axis and the second sensor axis extend in a diagonal manner and cross in front of the header before reaching the even ground surface.

2. The forage harvester of claim 1, wherein the first and second distance sensors are time-of-flight sensors.

3. The forage harvester of claim 1, wherein the first and second distance sensors are symmetrically positioned with respect to an upright plane that comprises a central axis parallel to a travelling direction.

4. The forage harvester of claim 1, wherein the first and second distance sensors are mounted higher than 20 cm above the even ground surface.

5. The forage harvester of claim 1, wherein the first and second distance sensors are mounted lower than 60 cm above the even ground surface.

6. The forage harvester of claim 1, wherein the first and second distance sensors are positioned such that, when on the even ground surface, the first sensor axis reaches the even ground surface in front of the header at a distance from the first distance sensor that is larger than 3 meter and at a distance from the first distance sensor that is smaller than 8 meter.

7. The forage harvester of claim 1, wherein the forage harvester is a self-propelled forage harvester.

8. The forage harvester of claim 1, further comprising a steering system and a controller operationally connected to the first and second distance sensors and provided for receiving a respective input from each of the first and second distance sensors, the controller being further operationally connected to the steering system, wherein the controller is adapted to provide steering instructions based on the respective input from each of the first and second distance sensors.

9. The forage harvester of claim 8, wherein the controller comprises a comparator operable to compare the respective input of the first distance sensor with the respective input of the second distance sensor to obtain a deviation, wherein the controller is adapted to steer the forage harvester based on the deviation.

10. The forage harvester of claim 1, wherein the first and second distance sensors are positioned such that the first and second sensor axes show an angle with respect to the forward travelling direction of the forage harvester that is larger than 35 degree.

11. The forage harvester of claim 1, wherein the first sensor axis crosses the second sensor axis at a crossing point that is located at a distance from the first distance sensor that is substantially equal to the distance between the second distance sensor and the crossing point.

12. A steering system for a harvester, the steering system comprising:
   a controller operationally connected to a first and a second distance sensor being adapted to measure a sensor-to-target distance respectively along a first and second sensor axis,
   wherein the first and second distance sensors are provided to be respectively placed at a first and second lateral end of a header of the harvester such that when the forage harvester is on an even ground surface, the first sensor axis and the second sensor axis extend in a diagonal manner and cross in front of the harvester before reaching the even ground surface in front of the harvester, wherein the controller is configured to control steering of the harvester based on an input from each of the first and second distance sensors.

13. A method for steering a harvester of claim 12, the method comprising steps of:

providing a first sensor-to-target distance, determined via the first distance sensor to the controller;
providing a second sensor-to-target distance, determined via the second distance sensor, to the controller;
calculating a difference between the first sensor-to-target distance and the second sensor-to-target distance; and
steering the harvester based on the calculated difference.

* * * * *